(12) United States Patent
Krawczyk

(10) Patent No.: US 10,809,890 B1
(45) Date of Patent: Oct. 20, 2020

(54) SYSTEMS AND METHODS FOR SEARCHING AND FILTERING MEDIA CONTENT

(71) Applicant: CMN, Inc., Bethesda, MD (US)

(72) Inventor: Nick Krawczyk, Chevy Chase, MD (US)

(73) Assignee: CMN, Inc., Bethesda, MD (US)

( * ) Notice: Subject to any disclaimer, the term of this patent is extended or adjusted under 35 U.S.C. 154(b) by 0 days.

(21) Appl. No.: 16/192,747

(22) Filed: Nov. 15, 2018

Related U.S. Application Data

(60) Provisional application No. 62/587,280, filed on Nov. 16, 2017.

(51) Int. Cl.
| | |
|---|---|
| *G06F 3/0485* | (2013.01) |
| *G06F 3/0481* | (2013.01) |
| *G06F 7/00* | (2006.01) |
| *G06F 3/0484* | (2013.01) |
| *G06F 3/0488* | (2013.01) |
| *G06F 16/2457* | (2019.01) |
| *G06F 16/435* | (2019.01) |
| *G06F 16/9535* | (2019.01) |
| *G06F 16/438* | (2019.01) |

(52) U.S. Cl.
CPC .......... *G06F 3/0484* (2013.01); *G06F 3/0481* (2013.01); *G06F 3/04883* (2013.01); *G06F 16/24578* (2019.01); *G06F 16/435* (2019.01); *G06F 16/438* (2019.01); *G06F 16/9535* (2019.01)

(58) Field of Classification Search
CPC ....... G06F 16/41; G06F 16/435; G06F 16/172
See application file for complete search history.

(56) References Cited

U.S. PATENT DOCUMENTS

| | | | |
|---|---|---|---|
| 5,524,193 A * | 6/1996 | Covington | G06F 16/748 715/210 |
| 8,448,076 B2 * | 5/2013 | Hammack | G05B 19/409 715/763 |
| 9,081,777 B1 * | 7/2015 | Krawczyk | G06F 16/41 |
| 9,183,589 B2 | 11/2015 | Melcher et al. | |
| 9,501,481 B2 * | 11/2016 | Weening | G06F 16/435 |
| 9,614,807 B2 | 4/2017 | Spivack et al. | |

(Continued)

*Primary Examiner* — Jordany Nunez
(74) *Attorney, Agent, or Firm* — Wilson Sonsini Goodrich & Rosati

(57) ABSTRACT

The present disclosure provides a method for searching and filtering media content, comprising presenting, with the aid of a computer processor, a first media stream from a previous filtering result. The first media stream may be generated from content aggregated from a plurality of different sources over a network. Two or more graphical elements associated with two or more content filter panels may be provided in a user interface for filtering the first media stream. The two or more content filter panels may comprise at least a first panel for filtering by media source and a second panel for filtering by social tag. A navigational gesture may be received on the user interface indicating a selection of a content filter panel. A second media stream may then be generated in response to a selection of an item provided by the selected content filter panel.

19 Claims, 12 Drawing Sheets
(11 of 12 Drawing Sheet(s) Filed in Color)

(56) References Cited

U.S. PATENT DOCUMENTS

| | | | |
|---|---|---|---|
| 2008/0301579 A1* | 12/2008 | Jonasson | G06F 16/958 |
| | | | 715/803 |
| 2012/0311453 A1 | 12/2012 | Reyna et al. | |
| 2014/0310644 A1* | 10/2014 | Hunt | G06F 3/0481 |
| | | | 715/784 |
| 2014/0337346 A1* | 11/2014 | Barthel | G06F 16/435 |
| | | | 707/738 |
| 2015/0169744 A1 | 6/2015 | Walkingshaw et al. | |
| 2016/0041702 A1 | 2/2016 | Wang et al. | |

* cited by examiner

SYSTEMS AND METHODS FOR SEARCHING AND FILTERING MEDIA CONTENT

CROSS-REFERENCE

This application claims the benefit of U.S. Provisional Application No. 62/587,280, filed Nov. 16, 2017, which is entirely incorporated herein by reference.

BACKGROUND

Media refers to communication tools used to store and deliver information or data, and includes but is not limited to mass media, multimedia, news media, published media, hypermedia, broadcast media, advertising media, social media (i.e., media disseminated through social interaction) and/or other types of media. Media can be delivered over electronic communication networks. Media communications can include digital media (i.e., electronic media used to store, transmit, and receive digitized information). Media includes privately communicated information or data, publicly communicated information or data, or a combination thereof. Media can be Social media. Social media includes web-based and mobile technologies which may or may not be associated with social networks. For example, social media such as blogs may not be associated with a social network. Social media includes privately communicated information or data, publicly communicated information or data, or a combination thereof. Currently there are multiple social networks that enable users to post content.

Given the vast amount of digital information readily available, searching for specific information can be a challenge. One common method for searching for information is key word searching. However, other methods of searching, such as those utilizing symbols and user interfaces, may be more user friendly and accurate.

SUMMARY

Recognized herein are various limitations associated with searching media content. Further recognized herein are various limitations associated with searching social media content. For example, some social media aggregators currently available do not permit a user to seamlessly and intuitively organize (or aggregate), filter and/or search social media content by media source, social entity or social tag. In some circumstances, a user has to type in search keyword or conduct multiple searches to find content of interest. Accordingly, recognized herein is the need for systems and methods that automatically, seamlessly and intuitively filter and/or search aggregated media (social media).

This disclosure provides systems and methods for gesture-based navigation. Systems and methods provide users with intuitive navigational access to media content. Search or content filtering can be performed along multiple dimensions such as words and phrases, categories or media resources. In some instances, a relationship between media content, such as words and phrases, and users and/or entities that use them may be established. Such media content may, for example, be used on a system provided by a social media provider (e.g., Facebook®, Google+®). With the relationship established, systems provided herein enable users to view and/or search such media content based on various relationships between the media content and media sources and/or entities using intuitive gestures. Methods for establishing such relationships include those described in U.S. Pat. No. 9,081,777 entitled "Systems and methods for searching for media content," which is entirely incorporated herein by reference.

This disclosure provides systems and methods for navigating access to media content based on gestures. Methods of searching and filtering information using a graphical user interface are provided. Systems and methods provided herein may allow users to navigate media content along multiple dimensions in an intuitive manner. In some examples, a multi-dimensional relationship between media content can be generated and users are allowed to search and access the media content across multiple dimensions. For example, users may perform gestures to search or filter text, image and/or video information across multiple dimensions, such as tags, network entities, categories or media sources.

In an aspect, a computer-implemented method for presenting media content is provided. The method may comprise: (a) receiving a search query on an electronic device of a user; (b) using at least said search query to (i) generate a first media stream comprising a first set of content aggregated from a plurality of different sources and (ii) present the first media stream on a user interface of the electronic device of the user, which media stream is presented on the user interface with one or more animatable graphical elements; (c) receiving input from the user on the one or more animatable graphical elements; and (d) subsequent to receiving the input from the user in (c), (i) animating the one or more animatable graphical elements on the user interface and (ii) presenting on the user interface a second media stream comprising a second set of content related to at least a subset of the first set of content.

In some embodiments, operation (d) further comprises generating the second media stream from at least a portion of the first media stream. In some embodiments, the electronic device is a portable electronic device. In some embodiments, the method further comprises receiving a gesture from the user to navigate the second media stream, proceed to an additional medial stream, or proceed from the second media stream to the first media stream.

In some embodiments, the second set of content comprises at least a subset of the plurality of different sources used to generate the first media stream. In some cases, the subset of the plurality of different sources are ranked by the number of results provided by each source. In some embodiments, the second set of content comprises at least a portion of the first content automatically and the second set of content is grouped by social tags. In some cases, the second set of content is ranked based on relevancy of the social tags. In some embodiments, the method further comprises, prior to (c), animating the one or more animatable graphical elements on the user interface with a first animation, and subsequent to (c), animating the one or more animatable graphical elements with a second animation, wherein the second animation is different than the first animation.

In a separate yet related aspect, a system for presenting media content is provided. The system may comprise: a communication interface in communication with a plurality of different sources of content; and one or more computer processors operatively coupled to the communication interface, wherein the one or more computer processors are individually or collectively programmed to: (a) receive a search query on an electronic device of a user; (b) use at least the search query to (i) generate a first media stream comprising a first set of content aggregated from the plurality of different sources through the communication interface, and (ii) present the first media stream on a user interface of the electronic device of the user, which media stream is presented on the user interface with one or more animatable graphical elements; (c) receive input from the user on the one or more animatable graphical elements; and (d) subsequent to receiving the input from the user in (c), (i) animate the one or more animatable graphical elements on the user interface and (ii) present on the user interface a second media stream comprising a second set of content related to at least a subset of the first set of content.

In some embodiments, the one or more computer processors are programmed to further generate the second media stream from at least a portion of the first media stream. In some embodiments, the electronic device is a portable electronic device. In some embodiments, the one or more computer processors are programmed to further receive a gesture from the user to navigate the second media stream, proceed to an additional medial stream, or proceed from the second media stream to the first media stream. In some embodiments, the second set of content comprises at least a subset of the plurality of different sources used to generate the first media stream. In some cases, the subset of the plurality of different sources is ranked by the number of results provided by each source. In some embodiments, the second set of content comprises at least a portion of the first content automatically and the second set of content is grouped by social tags. In some cases, the second set of content is ranked based on relevancy of the social tags. In some embodiments, the one or more computer processors are programmed to further, prior to (c), animate the one or more animatable graphical elements on the user interface with a first animation, and subsequent to (c), animate the one or more animatable graphical elements with a second animation, wherein the second animation is different than the first animation.

Another aspect of the present disclosure provides a non-transitory computer readable medium comprising machine executable code that, upon execution by one or more computer processors, implements any of the methods above or elsewhere herein.

Another aspect of the present disclosure provides a system comprising one or more computer processors and computer memory coupled thereto. The computer memory comprises machine executable code that, upon execution by the one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 9A-FIG. 10C show content filter panels for filtering search results by social tags or words with the aid of animatable graphical elements;

FIG. 10A-FIG. 10C show content filter panel for filtering search results by industries with aid of animatable graphical elements;

FIG. 12-FIG. 12C show content filter panel for filtering within previous search results by media sources with aid of animatable graphical elements.

DETAILED DESCRIPTION

Figure 1:
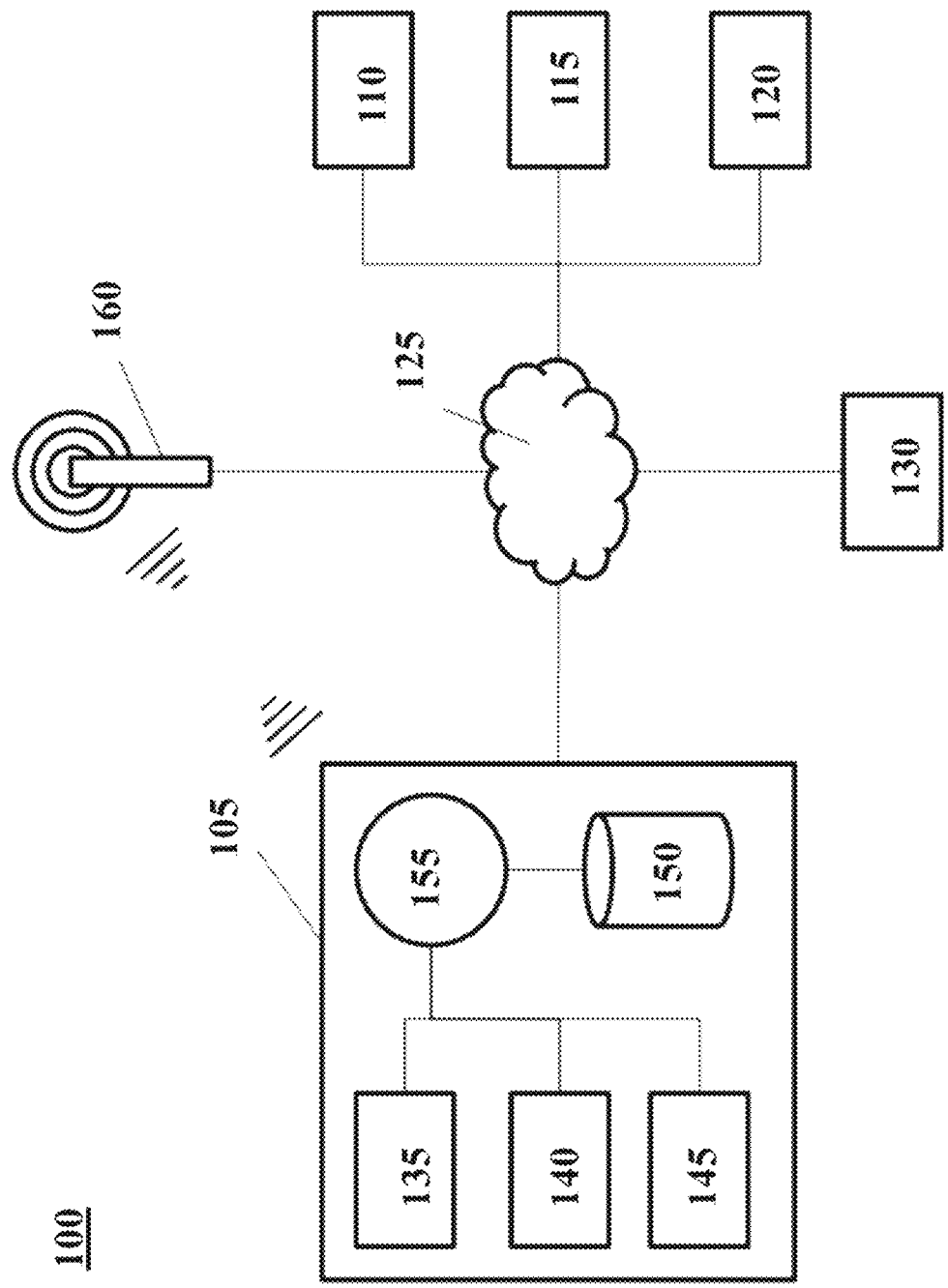
FIG. 1 shows a system for implementing the methods of the disclosure.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed in practicing the invention.

The term "media provider," as used herein, generally refers to a service that stores or otherwise provides media content. A media provider may be a "social media provider," which generally refers to a service that stores or otherwise provides social media content. A media provider can turn communication into an interactive dialogue. Some media providers, such as social media providers, can use web-based and mobile technologies to provide such interactive dialogues.

The term "media content," as used herein, generally refers to textual, graphical, audio and/or video information (or content) on a computer system or a plurality of computer systems. In some cases, media content can include uniform resource locators (URL's). Media content may be information provided on the Internet or one or more intranets. In some cases, media content is social media content, which can include textual, graphical, audio and/or video content on one or more social media networks, web sites, blog sites or other web-based pages. Social media content may be related to a social entity or social contributor.

The term "network stream," as used herein, generally refers to a display, such as an aggregate display, of the media activities of an entity or person that can be searched, grouped and filtered. A network stream may be a "media stream," which generally refers to a display, such as an aggregate display, of the social media activities of an entity, organization, resource or person that can be searched, grouped and filtered.

A network stream may be updated in real-time or at a given time point or interval. For example, a network stream is updated continuously. As another example, a network stream is updated manually. As another example, a network stream is updated every at least one microsecond, one millisecond, one second, ten seconds, one minute, or ten minutes. A network stream may be updated in response to a search or filter request. For example, the network stream may be updated in response to a keyword search, or a navigational gesture indicating a request for a specific filtering action.

The term "network entity," as used herein, generally refers to an entity, such as a company, group or organization, which may be associated with media content. A network entity may be a "social entity", which is a network entity associated with social media content. A network entity may be a company that distributes media content over the Internet. A social entity may be a company that distributes social media content with the aid of a service provided by a social media provider (e.g., Facebook®). In some cases, an entity may be a network entity as well as a social entity. A search engine indexes an entity's social media initiatives and subsequently displays contributors', users' and entities' posts that mention such entity in their social media activities. In an example, a user searches "New patents" and results display all social media by "Duke Global Health Institute" that mentions new patents. In some cases, a network entity can be a media sources.

The term "network contributor," as used herein, generally refers to an entity, a source or a user that has contributed media content on a network, such as the Internet and/or an intranet. The term "network contributor" may be interchangeably used with "media source" throughout the specification. Generally, the content of the media source is an intellectual property asset of the author of the source. For example, the media source can include content sources such as news websites, web magazines, video sharing sites, music sharing sites, and other web pages published by any web publisher. The media source may also include any entities that contribute media content over the Internet with aid of a service provided by a social media provider (e.g., Facebook®), such as user-generated blogs, news magazines, feed for a source of content (e.g., CNN, BBC, etc), and the like. A media source can be in any form or include any external source such as an API feed, a point and shoot camera, a digital camera, an article source, a photo source, a social media source, a news provider, a broadcast or cable television or media company, and the like. A network contributor may be a "social contributor", which is a user that has contributed social media content. In some cases, a person can be a network contributor as well as a social contributor. The social media content may be of or related to a social entity.

The term "tag," as used herein, generally refers to words or text strings that are used by network entities and/or media sources within, or at least within, a given percentage or frequency of usage. For instance, a tag can be a word or text string that is most utilized by network entities and/or media sources. A tag may be a "social tag", which generally refers to the most utilized words or text strings that are used, such as by a user, in the user's social media activities (e.g., Facebook® activities), or used by a media source, such as "Duke Global Health Institute", in the media source's social media activities (e.g., Twitter® tweets).

The term "network," as used herein, generally refers to a computer network. A network can include the Internet, one or more intranets, or both. A network in some cases includes a computer environment for the distribution of media content. A network can include a computer environment provided by a media provider, such as a social media provider.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

Systems and Methods for Establishing Relationships

Some embodiments provide systems and methods for establishing relationships between media content and users and/or entities that use, or make reference to, the media content. In some examples, the media content is social media content, and a relationship between the media content and social entities and/or media sources may be established. In other examples, the media content may be Internet or World Wide Web ("web") content, and the relationship between the media content and users and/or entities that use, or make reference to, the media content may be established. Such relationships may be presented to a user on a user interface, such as a graphical user face, of a computer display ("display") of an electronic device of the user. Such relationships may be automatically generated when receiving a user inputted gestured indicating a request for a search.

Some embodiments provide a method for searching for or filtering media content over a network, comprising conducting, with the aid of a computer processor (also "processor" herein), a search for one or more media content over the network. The search is directed to a search string. The search string may include one or more tags. The search string can be any keyword inputted by a user. The results of the search are then provided. The results include one or more media content, which can be provided in accordance with a relationship between the search string and a tag, media sources, and/or network entity associated with an individual media content of the one or more media content revealed upon the search.

Some embodiments provide a search engine that indexes social media activities or content and subsequently facilitates the strategic searching, filtering, and displaying of such social media activities or content by industries, media sources, tag or entity. The search engine can index the World's social media. The search engine can include one or more computer systems having memory locations for executing machine readable code for implementing various methods for collecting or aggregating social media content, as provided herein. The search engine can be adapted (e.g., programmed or otherwise configured) to a search engine for any media type. Thus, any description of a search engine herein can apply to any search engine for media content.

The search engine can include a data mining module for searching the Internet and/or an intranet to collect social media content of interest to a user. The data mining module can also search for and gather social media content that is related to a social entity, industry or category, media source or social tag specified by the user.

In accordance with the present disclosure, users may refer to people ("contributors"). Any features of the methods and systems described herein as relating to a user may also relate to an entity. Thus, a user can include both contributors and entities. In some embodiments, a user may refer to a social contributor and/or a social entity.

Some embodiments provide a system for collecting and aggregating social media content to be searched by a user using navigational gestures. The media content can be provided to a user by way of a media stream. In some cases, the media stream includes an aggregate collection of social media content. The media stream can be an aggregate display of all social media content retrieved by the system, or a subset, such as a media stream that relates to a particular social entity or media resource, or a media stream that is directed at a particular term, such as a tag or keyword. The media stream can be categorized, such as by social entity, industries, media sources or social tag. The social stream can be categorized based on the content. For instance, the categories may include news, technology, sports, lifestyle, social networks, blogs, videos, user favorites, and the like.

In some cases, a media stream as result of a search action or filter action can be categorized and displayed by industries. This can permit a user to view and filter the media stream by selecting an industry. The media stream may be automatically categorized by media source or social tag. The media stream can be further filtered by a user-selected media source or social tag using a navigational gesture.

In some cases, a media stream of a selected industry can be further categorized and displayed by media resource or social tag. This can permit a user to view and filter the media stream by media resource or social tag by performing a navigational gesture corresponding to the media resource or social tag.

Systems and methods provided herein can permit users to automatically aggregate or collect and filter social media content. In some cases, the aggregated media content can permit multi-dimensional navigation of media streams, such as across industry or category dimension, media source dimension, or social tag dimension. Other dimensions can also be included, such as social entity. Media sources, industries, social tags, and social entities, are also referred to as "dimensions" or "social dimensions" herein. In some embodiments, a social dimension can refer to a particular type of dimension associated with social media content, while a dimension can refer to a dimension associated with any type of media content. The dimensions can be orthogonal dimensions—that is, dimensions that are mutually exclusive. As an alternative, some of the dimensions can be inclusive of other dimensions. For example, the social entity dimension can overlap at least to some extent with the media source dimension.

Systems for Searching Social Media Content

Systems and methods of the disclosure can provide a gesture-based navigational access to media contents aggregated by categories (e.g., lifestyle, technology, sports, news, etc), tags or media sources (e.g., CNN, Mashable-Tech, Duke Global Health Institute). In some cases, social media content can be aggregated by single social media provider (e.g., Facebook®), or across multiple social media providers (e.g., Facebook® and Google+®). Any system or method of the disclosure referred to as "social", or described in connection with serving social media, may also be applied to any other media type(s). Thus, systems and methods described herein are understood to apply to any media content and are not to be limited to social media content.

In some embodiments, navigation may be accomplished using touch-based gestures, such as swipes and taps. Such a method may permit a user enter one or more search or filtering criteria, search of filtering action on a touch-screen device using a thumb of the user while the user is holding the device.

An aspect of the disclosure provides a system for providing a gesture-based search engine to a user. The search engine can be used to search for media content. The search engine may comprise a user interface. The systems may allow a user to conduct search of media content substantially via user gestures (e.g., swipes or taps). The systems may allow a user to perform a search across dimensions such as words and phrases (i.e., tags or social tags), categories (i.e., industries) or media resources. A user is allowed to switch across such dimensions efficiently using user gestures.

The system or the search engine can be configured (e.g., programmed) to aggregate or collect social media content. Systems described herein in the context of social media can apply to any media type(s) and are not limited to social media. The system comprises a communications interface operatively coupled to one or more social media providers, and a memory location having machine executable code implementing methods provided herein. In some embodiments, the methods comprise collecting, with the aid of the communications interface, social media content from the one or more social media providers, and generating, with the aid of a processor, a media stream from the collected social media content. At least a portion of the media stream is grouped by industries, media sources or social tag to form grouped media content. At least a portion of the grouped media content is presented to the user. The grouped social media content can be presented to the user on the basis of industries, media source or social tag. The grouped social media content may be viewed by a user-selected industry, media source or social tag using one or more navigational gestures.

FIG. 1 shows a system 100 for implementing the methods of the disclosure in accordance with an embodiment of the invention. The system 100 may be adapted to provide gesture-based search engine for social media content. The system 100 includes a computer system 105 that is in communication with a first social media provider 110, a second social media provider 115 and a third social media provider 120 with the aid of a network 125. The network 125 can be the Internet or an intranet that is operatively coupled to the Internet. In some contexts, the network 125 can be referred to as the "cloud." A user 130 employs a computer system of the user to create, edit and remove social media content on the social media providers 110, 115 and 120. The computer system of the user 130 can be a personal computer (PC), a terminal, a server, a slate or tablet PC (e.g., Apple® iPad®, Samsung Galaxy Tab), or a smart phone (e.g., Apple® iPhone®, an Android®-based phone). The social media providers can be, for example, Facebook®, LinkedIn®, Twitter®, YouTube, Pinterest®, Google+ or Instagram®. The social media providers can include overlapping content and non-overlapping content. For example, if the first social media provider 110 is Facebook and the second social media provider 115 is LinkedIn, the first social media provider 110 can include content relating to the social activities of the user 130, and the second social media provider 115 can include content relating to the job history and current employment of the user 130.

The computer system ("system") 105 includes a memory location 135, a communications interface 140, a display interface 145 and, in some cases, a data storage unit 150, which are all operatively coupled to a processor 155, such as a central processing unit (CPU). The memory location 135 may include one or more of flash memory, cache and a hard disk. In some situations the memory location 135 is read-only memory (ROM) or random-access memory (RAM), to name a few examples.

The computer system 105 may comprise a computing device. One or more users may be capable of interacting with the system 100 via the computing device. In some embodiments, the user may be searching for information, such as the aggregated media content via the computing device. In some embodiments, users may include any individual or groups of individuals using software or applications provided by the one or more servers running on the devices. For example, the users may access a user device or a web account using an application programmable interface (API) provided by the system. In some embodiments, more than one user may be associated with a device. Alternatively, more than one device may be associated with a user.

The computing device 105 may be a computer, server, laptop, or mobile device (e.g., tablet, smartphone, cell phone, or personal digital assistant), wearable devices (e.g., smartwatches) or any other type of device. The computing device may be a networked device. Any combination of devices may communicate with the system 100. The computing device can be a handheld device configured to be carried by a single hand of a user. The computing device may have a memory 135, processor 155, and/or display 145. The memory may be capable of storing persistent and/or transient data. One or more databases may be employed. Those persistent and/or transient data may be stored in the cloud. Non-transitory computer readable media containing code, logic, or instructions for one or more steps described herein may be stored in memory. The processor may be capable of carrying out one or more steps described herein. For example, the processor may be capable of carrying out one or more steps in accordance with the non-transitory computer readable media.

A display may show data and/or permit user interaction. For example, the display may include a screen, such as a touchscreen, through which the user may be able to view content, such as a user interface for searching for information. The user may be able to view a browser or application on the display. The browser or application may include a graphical user interface for searching for information. The touch screen may use a variety of display technologies to display the visual representation such as LCD (liquid crystal display) technology, or LPD (light emitting polymer display). The touch screen may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen. In examples, the touch screen may be a capacitive touch screen. When an object touches or comes within proximity of the surface of the capacitive touch screen, a change in capacitance may occur within the touch screen at the location of the touch or proximity. A touch-sensor controller may process the change in capacitance to determine its position on the touch screen. The touch screen may be configured to detect a variety of user gestures, such as such as tap, multiple-taps, swipe, drag, or hold & drag and processes user's gestures.

The computing device 105 may receive user input via any user input device. Examples of user input devices may include, but are not limited to, mouse, keyboard, joystick, trackball, touchpad, touchscreen, microphone, camera, motion sensor, optical sensor, or infrared sensor. Any type of user input may be provided via the user input device.

The data storage unit 150 can store social media content collected by the system 105. The data storage unit 150 can include one or more hard disks and other memory locations which are configured to store and, in some cases, index social media content. The data storage unit 150 can include one or more hard disks, memory and/or cache for data transfer and storage. The data storage unit 150 can include one or more databases, such as a relational database.

The communications interface 140 includes a network interface for enabling the system 100 to interact with the network 125, which may include an intranet, including other systems and subsystems, and the Internet, including the World Wide Web. In some cases, the system 105 further includes a data warehouse for storing information, such as user information (e.g., profiles) and results. In some cases, the data warehouse resides on a computer system remote from the system 105. In some embodiments, the system 105 may include a relational database and one or more servers, such as, for example, data servers.

The system 105 may include one or more communication interfaces or ports (COM PORTS), one or more input/output (I/O) modules, such as an I/O interface. The processor 155 may be a central processing unit (CPU) or a plurality of CPU's for parallel processing.

In some situations, the communications interface 140 enables the system 105 to wirelessly interface with the network 125. In such a case, the communications interface 140 includes a wireless interface (e.g., 2G, 3G, 4G, long term evolution (LTE), WiFi, Bluetooth) that brings the system 105 in wireless communication with a wireless access point 260 that is in communication with the network 125.

The system 105 may include a search engine that indexes social media content and facilitates the strategic searching and filtering of social media content by entity, contributor and tag. In some situations, via the social search engine, an aggregate display of the social media activities of an entity or person is provided, which can be searched and filtered. The search engine can permit a user to filter within the current media stream by any one of media source, industry, or social tag or by a user inputted keyword. In some cases, a user can further filter each social search stream result by date (e.g., the system 105 filters and displays results chronologically from the most recent data), content (e.g., the system 105 filters and displays results by content within an individual social media, such as, for example, text, audio/video, images and URL's), user rating (e.g., the system 105 filters and displays results by the highest rated, as determined by users) and/or sharing (e.g., the system 105 filters and displays results by most shared social media content among users).

The system 105 automatically group and sort search results. In some embodiments, search results can be grouped by social entity, industry, media source or social tag. Search results may be sorted by various fields, such as date (e.g., date retrieved by the system, date posted on a social provider), social entity, industry, media source or social tag, to name some examples.

For example, the system 105 can access the social media providers 110, 115 and 120 to search for social media content that is of or related to an entity (e.g., company, school), contributor (e.g., user) or tag (e.g., most frequently used words or text strings). In some embodiments, the system 105 accesses the social media providers and retrieves and stores social streams. The social streams may be of or related to a particular entity or contributor. The system 105 can store the social media streams in the data storage unit 150 of the system 105.

In some situations, the system 105 indexes an entity's social media initiatives and subsequently makes accessible various user and entity posts that mention the searched for entity in their social media activities.

The system 105 can index an entity's or user's social media initiatives and subsequently display the users and their posts that have provided social media content of or related to the entity or person.

The system 105 can index an entity or person's social media initiatives and subsequently display social media content (e.g., posts) having the most utilized word(s) that such person or entity used in its social media activities.

In some situations, a user can activate a search-within mode of the search engine of the system 105 to display and filter a media stream by media source, social tag, industry and/or keyword. Filtering can enable the user to drill down search results to get deeper results, all within the structure of the industries, media sources or social tag. In some situations, the system 105 presents the results of a search grouped by industries, media sources or social tag. The results can be provided on a display of the user, such as a graphical user interface (GUI, see below) of the display. The user can drill down from the industries, media sources to reveal various details of the group. In an example, a user drills down from an industry to reveal other categories, media sources or social tags that have referenced the industry.

In some cases, the system 105 can display search results or posts and rank the posts by content. In some cases, the system displays posts with the most content (e.g., text, images, URL's, rich media) at the top of the list. Subsequent posts from the top can be listed in the order of decreasing content. The system 105 can have software that is configured to operate on various operating systems, such as Linux-based operating systems or Windows-based operating system. The operating system can reside on a memory location of the system 105.

In some cases, the system 105 may permit the user 130 to create a social page or social profile. The profile can enable the user to list various attributes and interests of the user. In some cases, a user can create a social page and select only the social stream(s) or content that the user desires to view. In an example, a user selects and receives—on a private, dedicated webpage of the user-only the social streams that the user desires to view. In another example, a user is allowed to view media content when launching the search engine with previously stored user preference (e.g., trending now, news, popular, industry of interest, etc). The system can permit the user to filter posts provided in social streams, such as by date (e.g., newest toward the top) or content (e.g., posts with the most content toward the top). In some embodiments, the social page or social profile can be used in a data feed.

Systems of the disclosure may allow the user to set preferences and/or make selections. The preferences and/or selections may be used in a feedback loop to control one or more aspects of serving social media or any other media type.

The system 105 can be adapted to store user profile information, such as, social media profile information. Such profile information can be stored in the data storage unit 150 of the system 105.

Aspects of the systems and methods provided herein, such as the computer system 105, can be embodied in programming. Various aspects of the technology may be thought of as "products" or "articles of manufacture" typically in the form of machine (or processor) executable code and/or associated data that is carried on or embodied in a type of machine readable medium. Machine-executable (also "computer-executable" herein) code can be stored on an electronic storage unit, such as one or more memory (e.g., ROM, RAM) or one or more hard disks. Examples of hard disks include magnetic and solid state recording media. "Storage" type media can include any or all of the tangible memory of computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD or CD-ROM, a DVD or DVD-ROM, any other optical medium, punch cards paper tape, any other physical storage medium with patterns of holes, a RAM, a ROM, a PROM and/or EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

In some cases, code that is executable by a single processor can be executed by a plurality of processors, such as in a parallel processor environment or distributed computing fashion. Code that is executable by a plurality of processors may be executed by a single processor.

In some cases, the system 105 may be configured for data mining, extract, transform and load (ETL), or spidering (e.g., Web Spidering, where the system fetches data from remote systems over a network and accesses an Application Programming Interface (API) or parses the resulting markup) operations, which may permit the system to load information from a raw data source (or mined data) into a data warehouse. In some cases, one or more credentials are provided in order to access data (e.g., one or more credentials are provided for access through an API specific to a social media platform). The data warehouse may be configured for use with a business intelligence system (e.g., Microstrategy®, Business Objects®). The media file management system can include a data mining module adapted to search for media content in various source locations, such as email accounts and various network sources, such as social networking accounts (e.g., Facebook®, Foursquare®, Google+, LinkedIn®, Twitter®, Youtube, Instagram®) or on publisher sites, such as, for example, weblogs.

In some embodiments, the system comprises a user interface for presenting at least a portion of the grouped social media content to the user. The user interface in some cases is a graphical user interface.

Media content, such as search results, media stream and filtering or searching options, may be presented to a user with the aid of a user interface (UI), such as a graphical user interface (GUI), on an electronic device of the user. The UI, such as GUI, can be provided on a display of an electronic device of the user. The display can be a capacitive or resistive touch display, or a head-mountable display (e.g., Google® Goggles). Such displays can be used with other systems and methods of the disclosure. A GUI is a type of interface that allows users to interact with electronic devices through graphical icons and visual indicators such as secondary notation, as opposed to text-based interfaces, typed command labels or text navigation. The actions in a GUI are usually performed through direct manipulation of the graphical elements. In addition to computers, GUIs can be found in hand-held devices such as MP3 players, portable media players, gaming devices and smaller household, office and industry equipment. The GUIs may be provided in a software, a software application, a web browser, etc. Links may be generated through an application programming interface (API) which is a set of routines, protocols, and tools for building software applications. The user may interact with the GUI through direct touch on a screen.

A user interface may enable a user to interact with systems of the disclosure, such as for conducting searches directed at social media content. In some situations, the user interface is a graphical user interface (GUI) having various graphical, textual, audio and video elements.

A user interface can have a search field or search toolbar that enables a user to input one or more search terms to be used by the system to conduct a search. The search field can include a drop-down, pull-down or other type of menu to enable a user to select, for example, commonly used words or previous search strings.

In some embodiments, the system 105 of FIG. 1 is configured to present the results of a search using a GUI on a display of the system 105 or a remote system, such as a remote system of the user 130. The results can be displayed immediately following a search by a user, and in some cases updated as new information arrives on the system 105. In some situations, results are generated on the user interface as the user inputs text into a search field of the user interface.

The user interface can include a text field to enable a user to input text (or strings) to refine the results of a search. For example, a user can initially conduct a search for a certain keyword (e.g., "New patents") and subsequently refine the search by social tag (e.g., "future iphones") or media sources.

In some embodiments, following a search query from the user 130, the system performs a search of social media content and provides the results to the user 130 on a graphical user interface on a display of the system 105 of a computer system of the user 130. The user can then filter the search results using navigational gestures, drill down, or drill up. In addition, the GUI can enable the user to sort and group search results by various categories, such as social entity, social contributor or social tag.

In some embodiments, the user interface is a web-based user interface (also "web interface" herein) that is configured (e.g., programmed) to be accessed using an Internet (or web) browser of a computer system of the user 130 or any other system in communication with the system 105. The web interface can enable a user to search social media content and display search results by media source, industry, or social tag, and to drill down or drill up from the results to view varying levels of detail. The provided systems and methods may allow a user to perform the searches by social entity, media source, industry, or social tag, and to drill down or drill up from the results by navigational gestures on a user interface.

Some embodiments provide user interfaces for enabling a user to interact with systems provided herein. In some cases, the user interfaces are graphical user interfaces.

The GUIs described herein can provide a hierarchical, multi-dimensional category view to the user in response to the various navigational gestures. The GUIs described herein can provide social search organization. In some cases, the GUIs can be described as relational operating systems, which can visualize relationships between dimensions.

Figure 2:
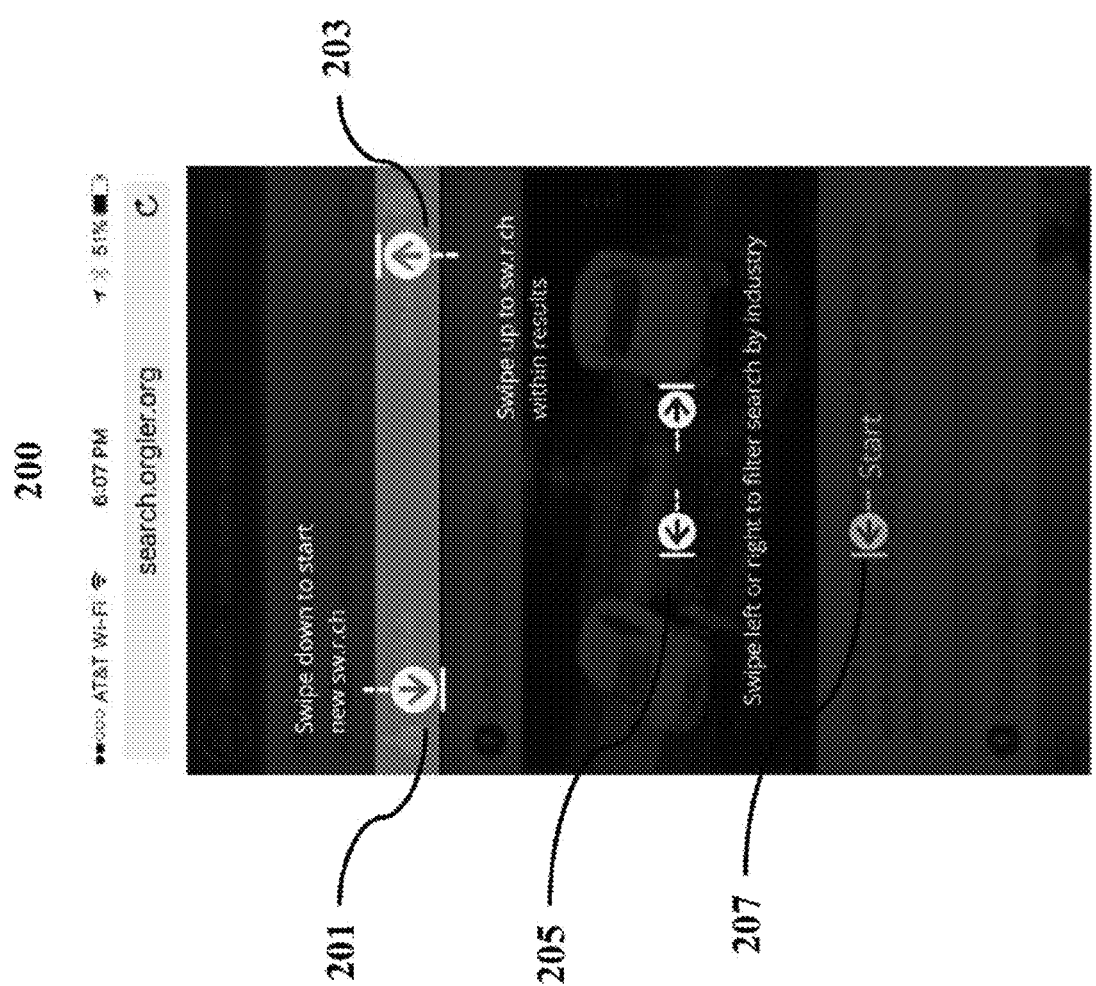
FIG. 2 shows an exemplary graphical user interface (GUI) for use with systems provided herein.

FIG. 2 shows an exemplary graphical user interface (GUI) 200 for use with systems provided herein, in accordance with an embodiment of the invention. In some embodiments, upon launching the application, a user may be presented a GUI 200 illustrating navigational gestures and associated searching or filtering actions. The GUI 200 may be presented to a user upon launching the application. Additionally or alternatively, the GUI 200 can be shown to a user in a tutorial or as tutorial function when activated by a request from a user.

As shown in the GUI 200, a plurality of navigational gestures 201, 203, 205, 207 may correspond to different filtering or search actions respectively. For example, a user may be allowed to input different gestures to switch among different navigational dimensions or filtering functions. The various different search actions may include, for example, start a new search, search or filter within current results, filter in a use-selected category or industry, search or filter by media sources, search or filter by tags or words, search or filter by user-inputted keywords, and the like. The plurality of navigational gestures may include, for example, swipe, drag, hold & drag, pinch, tap, multiple-taps, and various others associated with touch screen. The plurality of navigational gestures may include any other user gestures in connection with other technologies (e.g., motion detection detected by accelerometer).

In an example as shown in GUI 200, different swipe gestures may be used to indicate requests for different search actions. The navigational gestures may comprise, for example, a swipe action in a particular direction (e.g., up, down, left, right, or diagonally) on the user device associated with a specific search action. For example, a downward swipe 201 may trigger a new search action or new search mode. A user may perform a downward swipe in any region of the display screen to trigger a new search mode. Additionally or alternatively, a user may be required to input the swipe in a designated region to trigger the new search mode. For example, the downward swipe may need to be performed on top of the graphical element 201 displayed on the screen. When the search is in a new search mode, a user may be further allowed to input search criterion such as a keyword to initiate a new search.

The navigational gesture may trigger selection of a search mode. Different navigational gestures may trigger different search modes such as a new search mode (e.g., start a new search) or a search-within mode. For example, an upward swipe 203 may trigger a search or filter within current search results (i.e., search-within mode). When the search is in a search-within mode, a user may be allowed to determine filter the search results along different dimensions (e.g., media source or words) by performing associated navigational gestures (e.g., swiping left or right).

The navigational gesture may allow a user to scroll over a plurality of items of a selected search or filtering dimension. For example, a user may swipe left or right 205 to scroll over different categories for further filtering the search result. This allows a user to filter current search results by categories or industries. The categories or industries may be different from the tags or words.

The plurality of navigational gestures may correspond to the same search actions in different search modes. For example, an upward swipe may always trigger a search-within mode regardless of the current mode of the search. Alternatively, one or more navigational gestures may correspond to different search actions in different search modes. For example, left or right swipe may correspond to selection of searches along different dimensions when in the search-within mode, whereas the same left or right swipe may correspond to scrolling over different categories when search results are presented. In another example, a left swipe upon launching the application may correspond to a different action such as start using the application. A user may be allowed to trigger different search actions within a single page tab of a browser or a single page of the application. A user may be allowed to input at least a portion of the plurality of navigational gestures within a single page tab of a browser or the application. It should be noted the navigational gestures as described herein are for illustrative purpose only. Various other navigational gestures can be used to indicate request of the different search actions such as taps on different regions. Navigational gestures based on other technologies such as motions or attitude of the user device detected by motion sensors may also be used to trigger the different search actions.

In some embodiments, content may be displayed on a user interface (e.g., a graphical user interface) one or more animatable graphical elements. The one or more animatable graphical elements can be used in combination with or separately from one or more navigational gestures (e.g., swipe), as described elsewhere herein. The one or more animatable graphical elements may be used to receive user input indicating requests for different search actions.

The user interface may display at least 1, 2, 3, 4, 5, 6, 7, 8, 9, 10, 20, 30, 40, 50, or more animatable graphical elements. An animatable graphical element may include a geometric shape, such as a circle, triangle, square, rectangle, hexagon, heptagon, nonagon, or any partial shape or combination of shapes thereof. A graphical element may occupy at most 50%, 40%, 30%, 20%, 10%, 5%, 4%, 3%, 2%, 1%, or less of an area of a user interface. As an alternative, the graphical element may occupy at least 1%, 5%, 10%, 20%, 30%, 40%, 50%, or more of the area of the user interface.

An animatable graphical element may have various colors. In some examples, an animatable graphical element is red, orange, yellow, green, blue, indigo, or violet, or combinations of colors thereof.

The one or more animatable graphical elements may comprise any appearance, including any image, icon, shape, color, or combinations thereof, and may be displayed within a user interface of the application. The animation can include any movement or trajectory (e.g., fade in, fade out, blow-up, fly, shrink, blink, vibrate, etc.) to provide guidance or prompt a user as to one or more actions, such as further content filtering. In some cases, displaying the one or more animatable graphical elements in a particular direction (e.g., up, down, left, right, or diagonally) on the user device may be associated with a specific search action. For example, an animatable bubble displayed on the right-hand side may trigger a new search action or new search mode whereas an animatable bubble displayed on the left-hand side may provide further search across different categories, social tags, or topics for further filtering the search result.

The one or more animatable graphical elements can be used concurrently or in combination with other navigational gestures or input methods (e.g., swipe, click, voice command, text search, etc). For example, a user may perform a swipe (e.g., upward swipe) to trigger a search or filter within current search results (i.e., search-within mode). When the search is in a search-within mode, a user may be allowed to determine filter the search results along different dimensions (e.g., media source, industries, words or related topics) by interacting with the different animatable graphical elements (e.g., bubbles displayed on the left or right). Alternatively, a user may perform content search only use the animatable graphical elements. When the search is in a new search mode, a user may be permitted to input search criterion such as a keyword to initiate a new search.

With reference to FIGS. 3-12C, in some examples, systems and methods of the disclosure can automatically extract dimensions within social media of keyword searched and allow a user to navigate the content along different dimensions by corresponding user inputted navigational gestures. The systems and methods may define dimensions as a media source (also referred to as social contributor), categories (also referred to as industries), or word (also referred to as social tag). In some cases, a social tag may be a relevant topic or content related to the social media content. The social tag can be obtained or generated using various methods. For instance, the social tag can be extracted from the social media using natural language processing or machine learning techniques. A user may be allowed to perform a search along a selected dimension using corresponding navigational gestures at any level and for any number of times. For example, if a user wants to drill down five levels of search, the system can perform five searches, wherein a specific (media source, category, word) dimension is selected in each search operation. A dimensionalization operation can be performed by the system in order to provide grouped media results to the user. The dimensionalization can be an indexing operation. In some examples, if the user wants to drill down 'n' levels, the system can perform 'n' searches, wherein 'n' is a number that is greater than or equal to zero. In some examples, the system can drill down at least 1, 2, 3, 4, 5, 6, 7, 8, 9, 10, 100, 1,000, 10,000, 100,000, or 1,000,000 by performing at least 1, 2, 3, 4, 5, 6, 7, 8, 9, 10, 100, 1,000, 10,000, 100,000, or 1,000,000 searches, respectively.

Systems provided herein can organize a user interface (UI), which may be a graphical user interface (GUI), by listing such dimensions (i.e., the people and entities whose social media contains the keyword searched and the most used words within the social media of the people and entities that use the keyword searched).

All dimensions, including new dimensions, can be automatically indexed (i.e., all dimensions contained within the social media of the dimensions of the original keyword searched). This can allow a user to conduct a new search based on the relationships created by the original. This dimensional and relational approach can advantageously enable the search and user interface (e.g., GUI) features described herein.

EXAMPLES

Example 1

Figure 3:
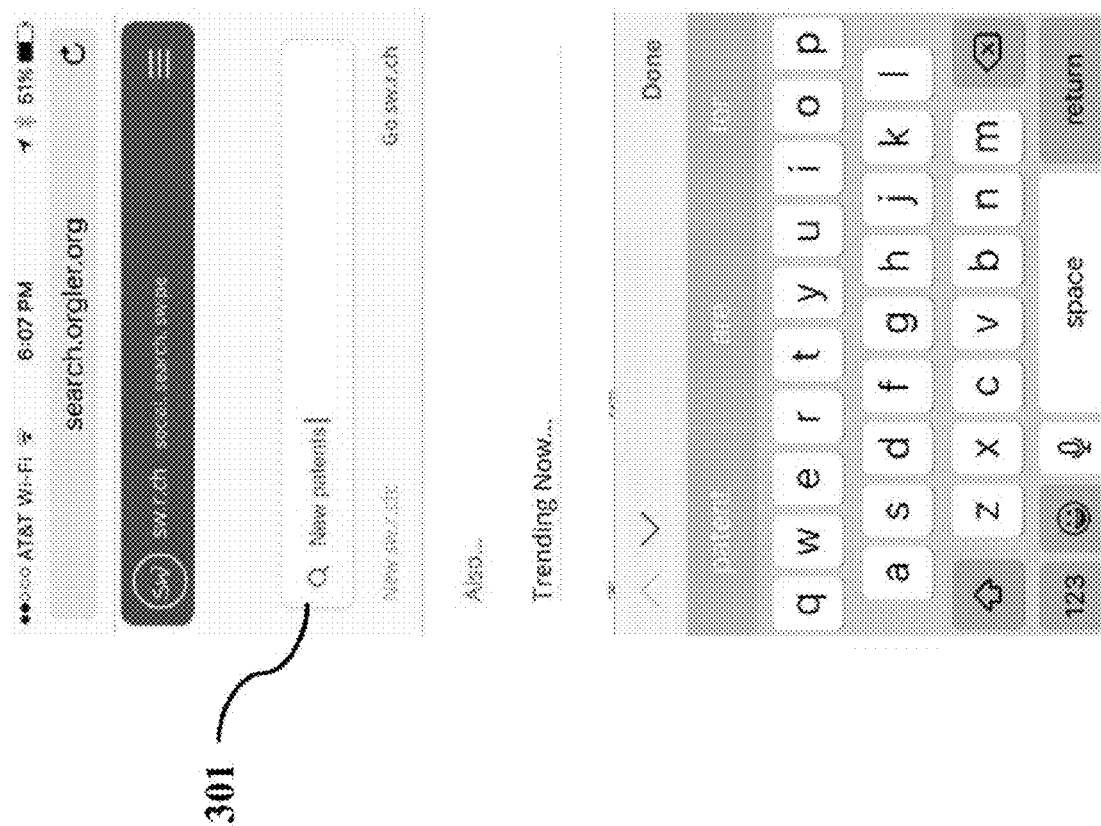
FIG. 3 shows a navigation search having a search toolbar.
Figure 4:
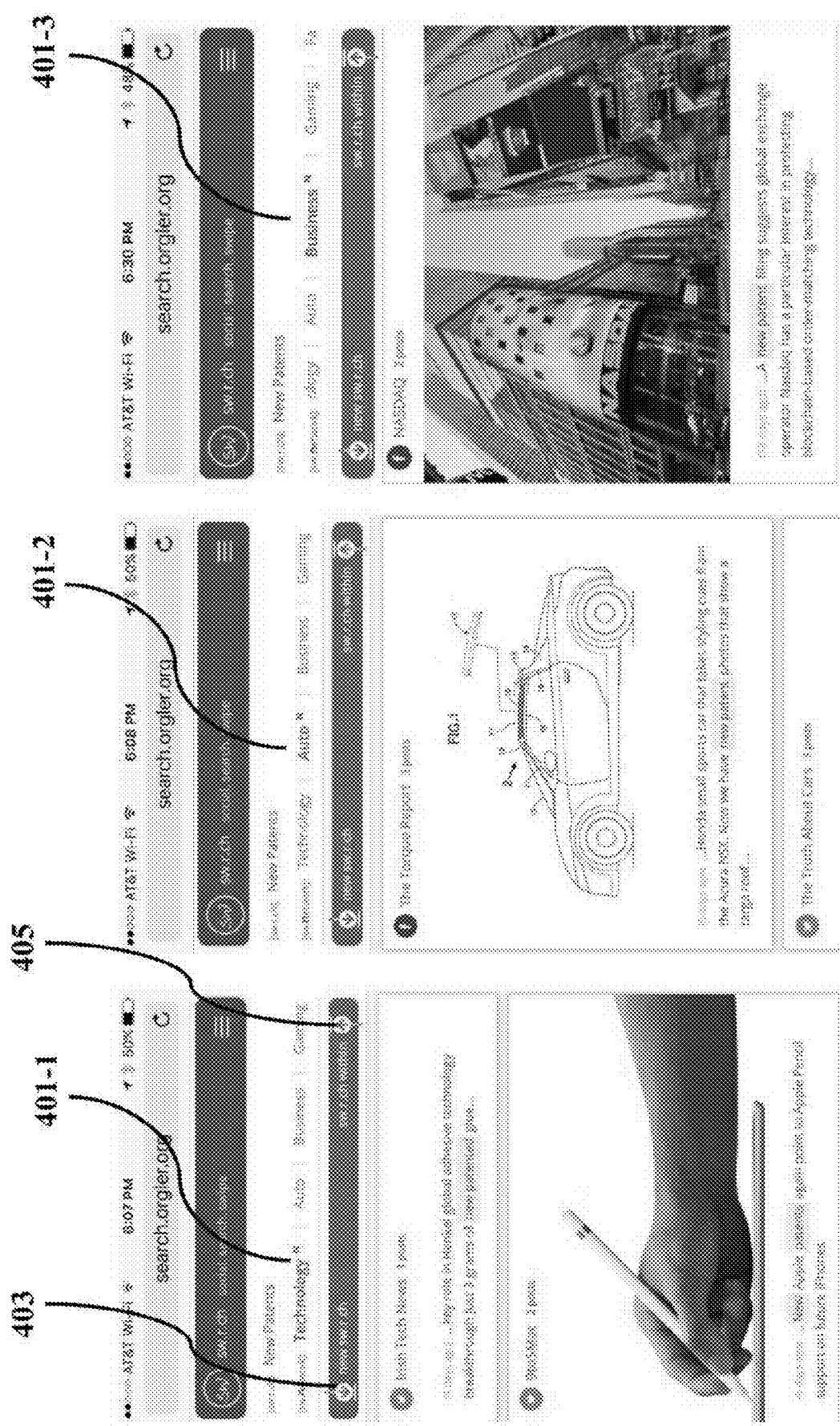
FIGS. 4A-4C shows the results of a search in which elements of a media stream are grouped by categories.

A user searches "New patents." After user performs a navigational gesture such as a leftward swipe or a downward swipe on the user interface shown in FIG. 2, a new search action is triggered. As shown in FIG. 3, the user may be allowed to input keyword such as "New patents" in the search toolbar or the search field 301. A user may input the keyword by typing texts via a keyboard, via voice command or various other input methods. The search field or the search toolbar can include a drop-down, pull-down or other type of menu to enable a user to select, for example, commonly used words or previous search strings. A media search using the toolbar generates a media stream directed at the terms of the search. A user is able to input search terms in a text field of the toolbar. In some cases, a user may indicate launching a search by tap on a graphical element (e.g., "Go sw.r.ch", "Done" on keyboard). In some cases, the search process is incremental, i.e., search as you type.

From the search terms, the system generates a media stream. The media stream, as illustrated, has a social breadcrumb structure that displays results categorized by industries or categories, media sources and social tag.

In the illustrated example, the search toolbar is embedded in a search engine. The search engine may provide the search toolbar on a single webpage of a browser, a mobile web page or a content aggregator type of application that is capable of sourcing media content from any suitable number of data sources. In some embodiments, in addition to the search toolbar, the search engine, when in a new search mode as shown in FIG. 3, may provide recommendation of media content (e.g., trending now). The recommendations may be provided by analytics used for advertising or for other purposes, such as evaluating general trends or interests across a population of users, or as preferences preset by the user.

The search engine may provide the user all results for New patents. The search engine may provide media stream in response to a user input indicating a request for performing the keyword search. The search engine may provide media content provided by various social media providers such as Facebook posts, Twitter tweets, Google+ posts, blog posts, YouTube videos/channels, LinkedIn posts or updates, 4Square posts and Yelp posts on a single webpage or mobile web page. The results can be indexed by social media provider (e.g., Facebook®, Twitter®, Google+®, etc.), social entity, media sources (i.e., social contributor), or social tag.

Example 2

FIGS. 4A-4C show search results of "New patents." The search engine provides the user all results of or relating to new patents. FIGS. 4A-4C show a section of the social stream for new patents, as indexed and displayed via the search engine of a system implementing the search. The results may be automatically indexed and grouped by categories or industries. The system conducts a search and enables the user to view and filter search results by industry ("Technology," "Auto," "Business", "gaming", etc). The categories or industries associated with different search results may or may not be the same. In some embodiments, the search results may be grouped and categorized into the same set of industries regardless of the keyword of the search. In some embodiments, the search results may be grouped and categorized into different sets of industries associated with the keyword of the search.

The search engine permits the user to search within a provided social stream by categories. The user may be allowed to scroll over different industries by navigational gestures such as swipe left or right. In some cases, the user may be allowed to input the navigational gestures in any region of the display. For example, the user may swipe left or right to scroll over the different categories in any location of the display. In some cases, the user may perform the navigational gestures in designated region of the display. For example, the user may be required to swipe left or right on top of the category or industry panels in order to input the filter instruction. FIG. 4A shows Twitter tweets from media sources Irish Tech News and 9to5Mac as a filtering result of Technology 401-1 of the keyword search results. FIG. 4B shows Facebook post from media source The Torque Report, Twitter tweet from media source The Truth About Cars as a filtering result of Auto 401-2 of the keyword search results. FIG. 4C shows Facebook post from media source NASDAQ as a filtering result of Business 401-3 of the keyword search results.

In some embodiments, the search engine may group results by social providers (e.g., Facebook, Twitter, etc.). In some embodiments, the search engine may group results by both media sources and social providers (e.g., 3 Facebook posts from The Torque Report).

In some embodiments, the search engine may comprise graphical elements 403, 405 prompting a user to perform filter or search within the current search results. The graphical elements may comprise different indicators corresponding to different navigational gestures. For example, as shown in FIG. 4A, the downward arrow 403 corresponds to a downward swipe and the upward arrow 405 corresponds to an upward swipe. In some embodiments, the graphical elements may be accompanied by texts descriptions (e.g., new sw.r.ch, sw.r.ch within) of the corresponding search actions. Such graphical elements may be shown at some or all of the search levels. A user may or may not need to perform the navigational gestures in a region indicated by the graphical elements. For example, a user may be allowed to perform a swipe-up or swipe-down in any region of the screen. In another example, a user may be requested to swipe up or swipe down on top of the corresponding graphical elements, whereas a swipe up or swipe down in a region outside of the graphical elements may cause scrolling over the media stream.

Different search actions can be performed with respect to the results. For example, a user may be allowed to start a new search such as new keyword search or perform further search or filter within current search results. Different navigational gestures may trigger different search actions. As shown in FIGS. 4A-4C, a downward swipe 403 may trigger a new search such as a new keyword search and an upward swipe 405 may trigger a search-within mode where a user is allowed to further filter the search results along multiple dimensions.

Example 3

Figure 5:
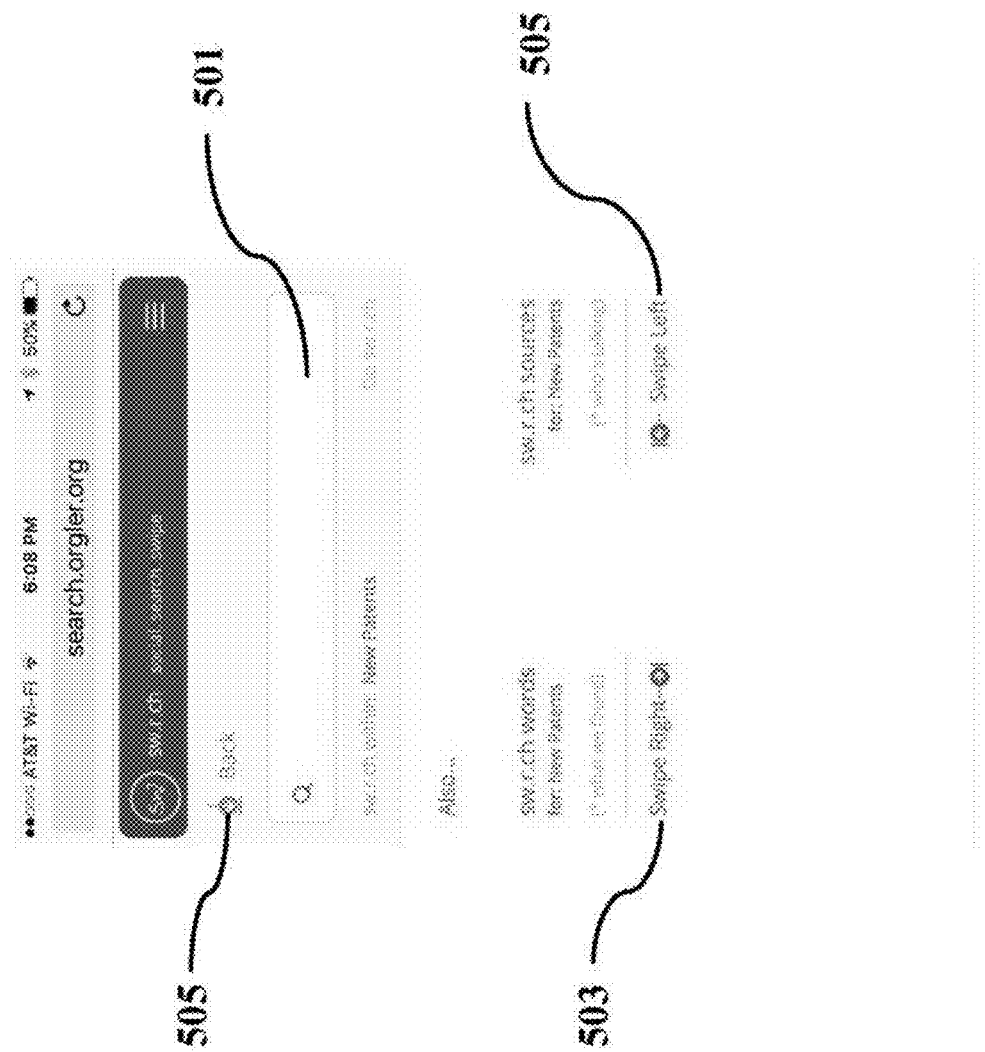
FIG. 5 shows a graphical user interface providing selection of content filter panels.

In response to a navigational gesture (e.g., swipe up 405) indicating a request for a search within current search results, a search-within mode is triggered. FIG. 5 shows further filters or searches can be performed to the current search results along multiple dimensions. The multiple dimensions may comprise at least media resource and word (i.e., social tag).

As shown in FIG. 5, when the search is in the search-within mode, graphical elements corresponding to different navigational gestures 503, 505 may be presented to a user. The different navigational gestures may trigger searches or filters of the current results along different dimensions. For example, as illustrated in the example, a right-swipe 503 corresponds to filter of the current results by word or tag, and a left-swipe 505 corresponds to filter of the current results by media sources. A user may or may not need to perform the navigational gestures in a region indicated by the graphical elements. For example, a user may be allowed to perform a left-swipe or right-swipe in any region of the screen. Alternatively, a user may be requested to swipe left or swipe right on top of the corresponding graphical elements.

The search-within mode may also allow the user to perform a keyword search using a search toolbar 501. A user may input a keyword to conduct a filter or search within current search results. The search-within mode may further allow a user to navigate back to previous page or results. For example, a user may perform a navigational gestures 505 (e.g., swipe down) as indicated by the graphical element to trigger the navigate-back function.

Example 4

Figures 6A, 6B:
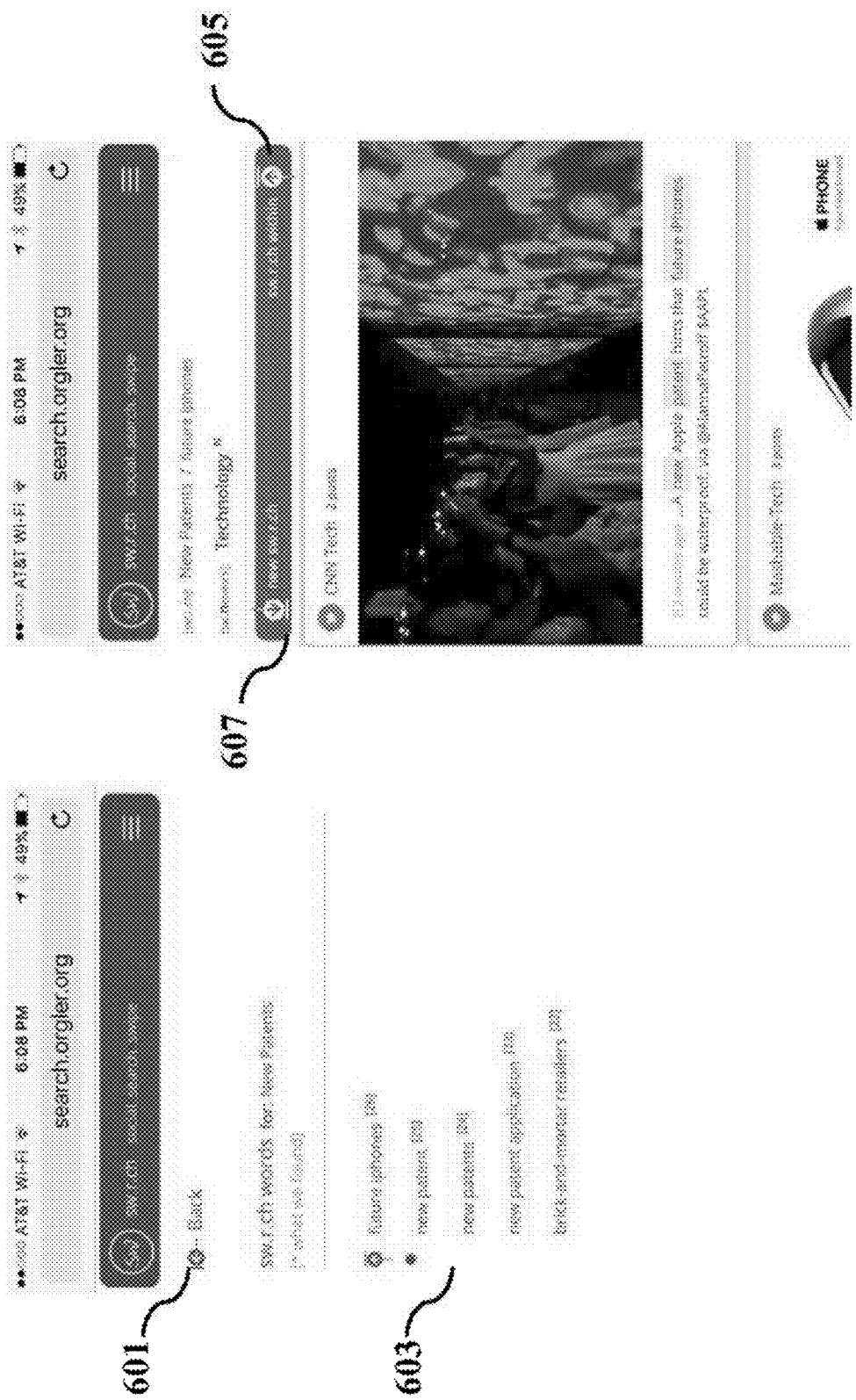
FIG. 6A and FIG. 6B show content filter panel for filtering search results by social tags or words and an example of filter result.

FIG. 6A and FIG. 6B show results in response to a navigational gesture (e.g., swipe right 503 on the page of FIG. 5) indicating a request to filter by words. A content filter panel 603 comprising one or more items such as words or tags may be presented to the user for selection upon receiving the navigational gesture (e.g., swipe right). The current search results or media stream may be automatically grouped or indexed by tags or words. In some embodiments, the most relevant tags or words may be displayed. The tags or words may be ranked or sorted according to relevancy. Various algorithms may be used to determine the ranking. For example, the ranking may be determined based, at least in part, on the social score of a given social tag. The social score in some cases is related to the social engagement score of a social entity or social contributor that uses the social tag (e.g., word) in their social media content (e.g., posts) and the social post score of the actual social post. In some cases, the social score is the sum of the social engagement score and the social post score. One or both of the social engagement score and the social post score may each be weighted by a scaling factor. Alternatively, the social score can be the social engagement score multiplied by the social post score.

A user may select an item from the content filter panel (i.e., a word or social tag) to further filter the search results. For example, a user may click on "future iphones" to trigger filtering within current results and to view media stream related to future iphones within current search results. FIG. 6B shows the results of filtering the media stream by "future iphones."

The user may also be allowed to input a navigational gesture indicating a request to navigate back 601. For example, the user may swipe left as indicated by the leftward arrow 601 to navigate backward to the previous page or results.

The current filter can be a drill-down from any category (e.g., "Technology" category) of the previous keyword search. In some cases, the filter results presented in FIG. 6B may be automatically indexed or grouped by categories or industries in the same manner as described in FIGS. 4A-4C. Further drill-down actions or search actions may also be provided in the same manner as described with reference to FIGS. 4A-4C. For example, a user may be allowed to perform a navigational gesture (e.g., swipe down) to start a new search 607 or perform another navigational gesture (e.g., swipe up) to trigger a search-within mode 605. The sequence of operations and subsequent drill-down of collected content can be repeated any number of times.

Example 5

Figures 7A, 7B:
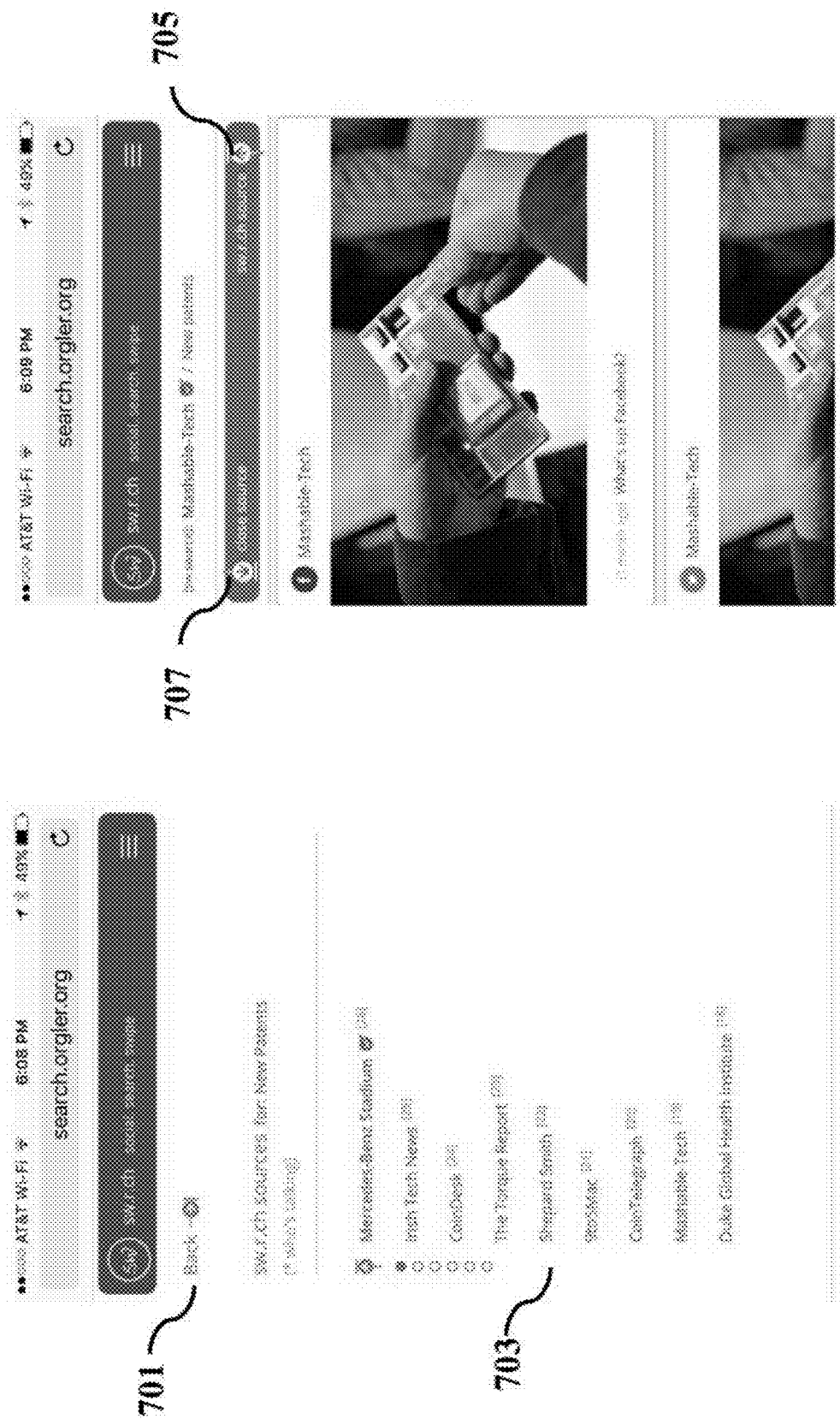
FIG. 7A and FIG. 7B show content filter panel for filtering search results by media source and an example of filter result.

FIG. 7A and FIG. 7B show results in response to a navigational gesture (e.g., swipe left 505 on the page of FIG. 5) indicating a request for filtering the media stream by media sources (i.e., social contributor). In response to a user performing a navigational gesture (e.g., swipe left 505 on the page of FIG. 5) in the search-within mode indicating a request for filtering along the media source dimension, a content filter panel 703 comprising one or more items such as media sources of the current search results may be presented to a user. In some cases, the media sources may be sorted by the number of results provided by a media source. The user may also be allowed to perform a navigational gesture indicating a request for navigate back 701. For example, the user may swipe left as indicated by the leftward arrow to navigate backward to the previous page or results.

A user may select an item from the content filter panel (i.e., a media source) For example, a user may click on "Mashable-Tech" to trigger a filter of current results and to view media stream provided by Mashable-Tech within current search results. FIG. 7B shows the results of filter media stream by "Mashable-Tech."

The current filter can be a drill-down from any category (e.g., "Technology" category) of the previous keyword search. In some cases, the filtered media stream as shown in FIG. 7B may be automatically indexed or grouped by categories or industries in the same manner as described in FIGS. 4A-4C. In some cases, further drill-down actions or search actions may be provided in the same manner as described with reference to FIGS. 4A-4C. For example, a user may be allowed to perform a navigational gesture (e.g., swipe up) 705 to trigger a search-within mode. In another example, a user may be allowed to input a navigational gesture (e.g., swipe down) 707 to end or close the current filtering such that the previous media stream without filtering may be presented to the user. The sequence of operations and subsequent drill-down of collected content can be repeated any number of times.

Example 6

Figure 8B:
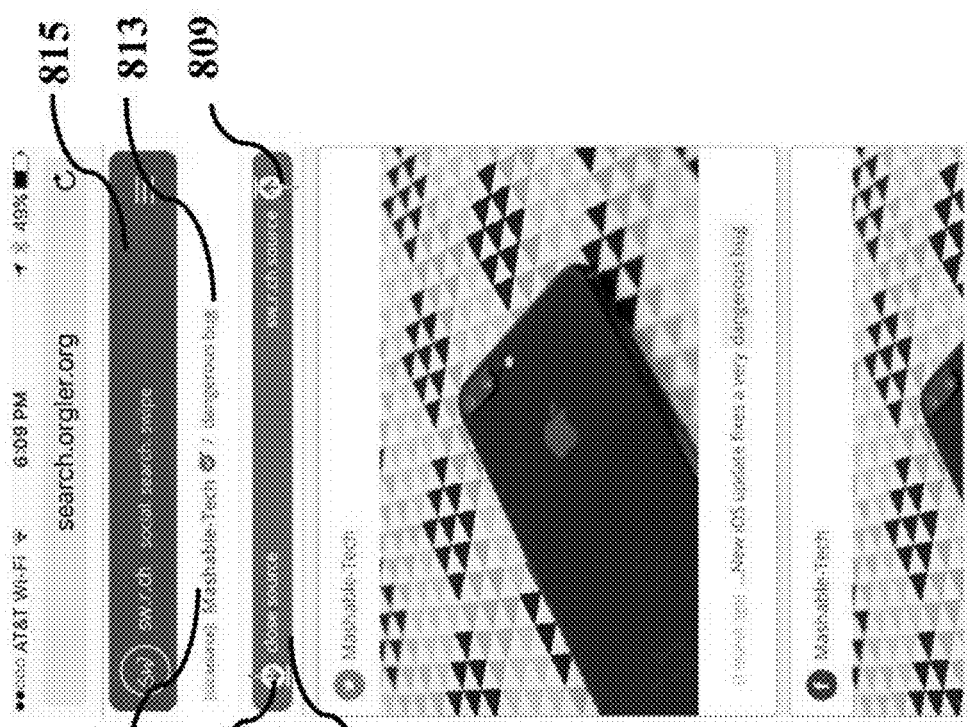
FIG. 8A and FIG. 8B show example of filtering search results by media sources then by social tags, in accordance with an embodiment of the invention.
Figure 8A:
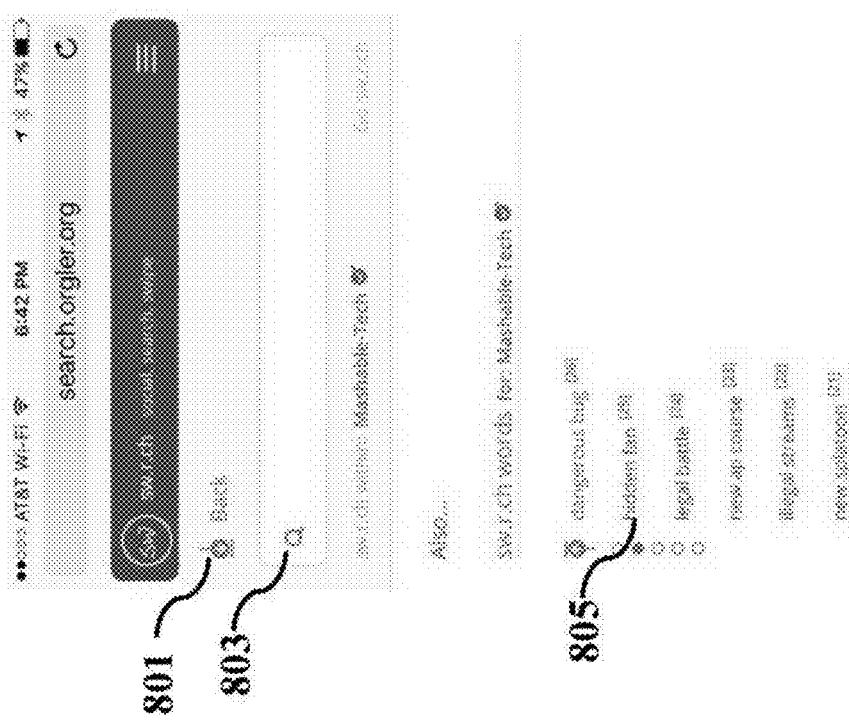

The drill-down of search results can be repeated any number of times. The drill-down of search results can comprise filter along different dimensions. FIG. 8A and FIG. 8B show results of subsequent drill-down searches comprising a first filter by words of the previous search results then a second filter by media sources. FIG. 8A shows a search-within mode triggered in response to a navigational gesture such as swipe-up 705 performed on the page shown in FIG. 7A. In the search-within mode, a content filter panel 805 comprising a list of words or tags associated with the current search results may be presented to the user in the same manner as described in FIG. 6A.

The user may be allowed to perform navigational gesture indicating a request for navigate back 801. For example, the user may swipe left as indicated by the leftward arrow to navigate backward to the previous page or results. The user may also be provided with a search toolbar 803 to perform keyword search. It should be noted that the search toolbar can be included in any search level or any mode. For instance, the search toolbar can be included in the search page shown in FIG. 6A.

Referring back to FIG. 8A, a user may select a word or tag using a gesture. For example, a user may tap "dangerous bug" to select the word. FIG. 8B shows the filtered media stream in response to the selection of "dangerous bug."

In some cases, further drill-down actions or search actions may be applied to the media stream filtered by "dangerous bug." Such drill-down actions or search actions may be provided in the same manner as described with reference to FIGS. 4A-4C. For example, a user may be allowed to input a navigational gesture (e.g., swipe up) 809 to trigger a search-within mode. In another example, a user may be allowed to input a navigational gesture (e.g., swipe down) 807 to end or close the current filtering such that the previous media stream without filtering may be presented to the user. The sequence of operations and subsequent drill-down of collected content can be repeated any number of times.

In some embodiments, different search dimensions may be color coded. For example, a page of the search engine may comprise breadcrumbs serving as an effective visual aid, indicating the location of the user within the site's hierarchy. The breadcrumbs may be color coded to reflect different filter dimensions. For example, the breadcrumbs comprising filter by media provider 811 and filter by word 813 may be presented in different colors. In the example illustrated in FIG. 8B, in the breadcrumbs, the text "Mashable-Tech" 811 corresponding to filter by media source is in a different color from the color of the text "dangerous bug" corresponding to filter by word. In some cases, the color of the search-within panel 817 associated search by media source is different from the color of the search-within panel 815 associated with search by tag or word.

Example 7

Figures 9A, 9B, 9C:

FIG. 9A shows an example search result of "pumpkin pie." This search result may be generated in response to a user inputting keywords. For example, user may be allowed to input keywords such as "pumpkin pie" in the search toolbar or the search field 901. A user may input the keyword by typing texts via a keyboard, via voice command or various other input methods. The search field or the search toolbar can include a drop-down, pull-down or other type of menu to enable a user to select, for example, commonly used words or previous search strings. A media search using the toolbar generates a media stream directed at the terms of the search. In some cases, the search process is incremental, i.e., search as you type. Alternatively, the term "pumpkin pie" may be inputted by the user selecting from a plurality of social tags or topics automatically generated by the system in a previous search result.

The search engine may provide the user all results for pumpkin pie. The search engine may provide media stream in response to a user input indicating a request for performing the keyword search. The search engine may provide media content provided by various social media providers such as Facebook posts, Twitter tweets, Google+ posts, blog posts, YouTube videos/channels, LinkedIn posts or updates, 4Square posts and Yelp posts on a single webpage or mobile web page. The results can be indexed by social media provider (e.g., Facebook®, Twitter®, Google+®, etc.), social entity, media sources (i.e., social contributor), or social tag.

Different search actions can be performed with respect to the search results. For example, a user may be permitted to start a new search such as new keyword search or perform further search or filter within current search results. As described above, different navigational gestures may trigger different search actions. For example, a downward swipe may trigger a new search such as a new keyword search and an upward swipe may trigger a search-within mode where a user is allowed to further filter the search results along multiple dimensions.

FIG. 9A illustrates a search-within mode. A user may further filter the search results along multiple dimensions with aid of animatable graphical elements. In the illustrated example, animatable graphical elements 903, 905, 907 may correspond to searches along different dimensions. The multiple dimensions may comprise media resource, industries/networks, and word (i.e., social tag or relevant topics) and others as described elsewhere herein. Such animatable graphical elements may be shown at some or all of the search levels. A user may interact with the animatable graphical elements by clicking or tapping on the bubbles to input a user selection.

The animatable graphical elements may be different in color, size, dimension, shape or other visual features to indicate different search dimensions. For example, the animatable bubbles 903, 905, 907 are different at least in color and locations where they are displayed. FIG. 9B illustrates a resultant media stream after user clicking/tapping on the animatable bubble 905. In response to receiving the user input at the bubble 905, the previous search result may be displayed by a plurality of social tags or topics (e.g., Thanksgiving day, best recipes, traditional dessert, etc). Concurrently, the bubble 905 may be animated (e.g., blue bubbles moving apart from each other) indicating further search along the social tag dimension is performed. The page displaying media stream grouped by social tags or relevant topics may slide over the previous page along with the animation of the bubbles 905. The resultant media stream is shown in FIG. 9C.

Example 8

Figures 10A, 10B, 10C:
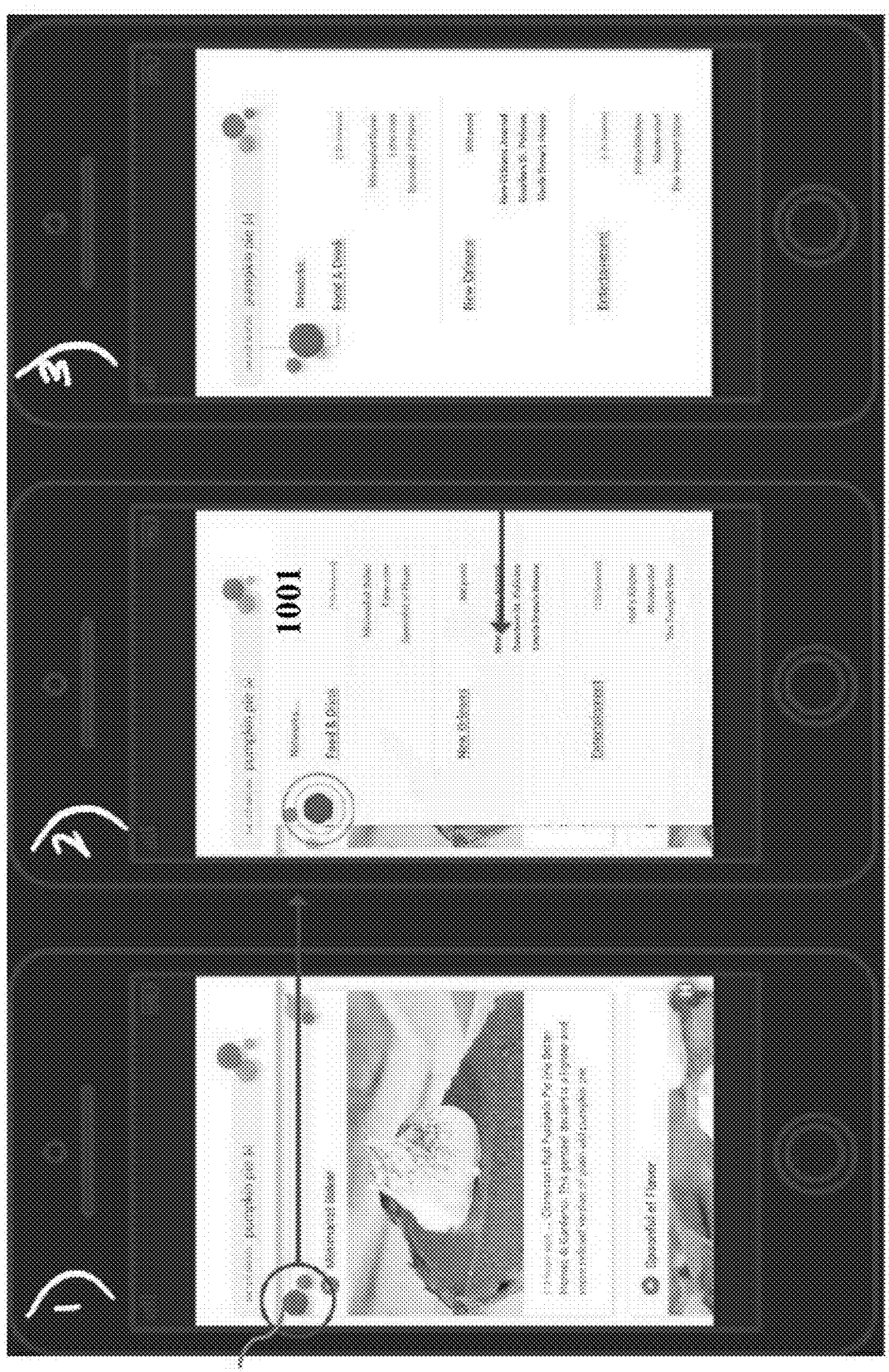

FIGS. 10A-10C show results in response to a navigational gesture (e.g., selecting animatable bubbles 903 on the page of FIG. 9A or FIG. 10A) indicating a request for filtering the media stream by industries or networks. In response to receiving a user input at the animatable bubbles (e.g., tap or click on the purple bubbles 903 on the page of FIG. 9A or FIG. 10A) in the search-within mode indicating a request for filtering along the industries dimension, a content filter panel 1001 comprising one or more items such industries/networks (e.g., Food&drinks, New Orleans, Entertainment, etc) of the current search results may be presented to a user. FIG. 10B illustrates that the content filter panel 1001 may slide over the previous page along with animation of the bubbles 903. In some cases, the industries or networks may be sorted or ranked based on relevancy. In some cases, the relevancy may be determined using machine learning techniques. The user may also be allowed to perform a navigational gesture indicating a request for navigate back to the previous search result. For example, the user may swipe left on the page shown in FIG. 10C to navigate backward to the previous page or results.

Example 9

Figures 11A, 11B, 11C:
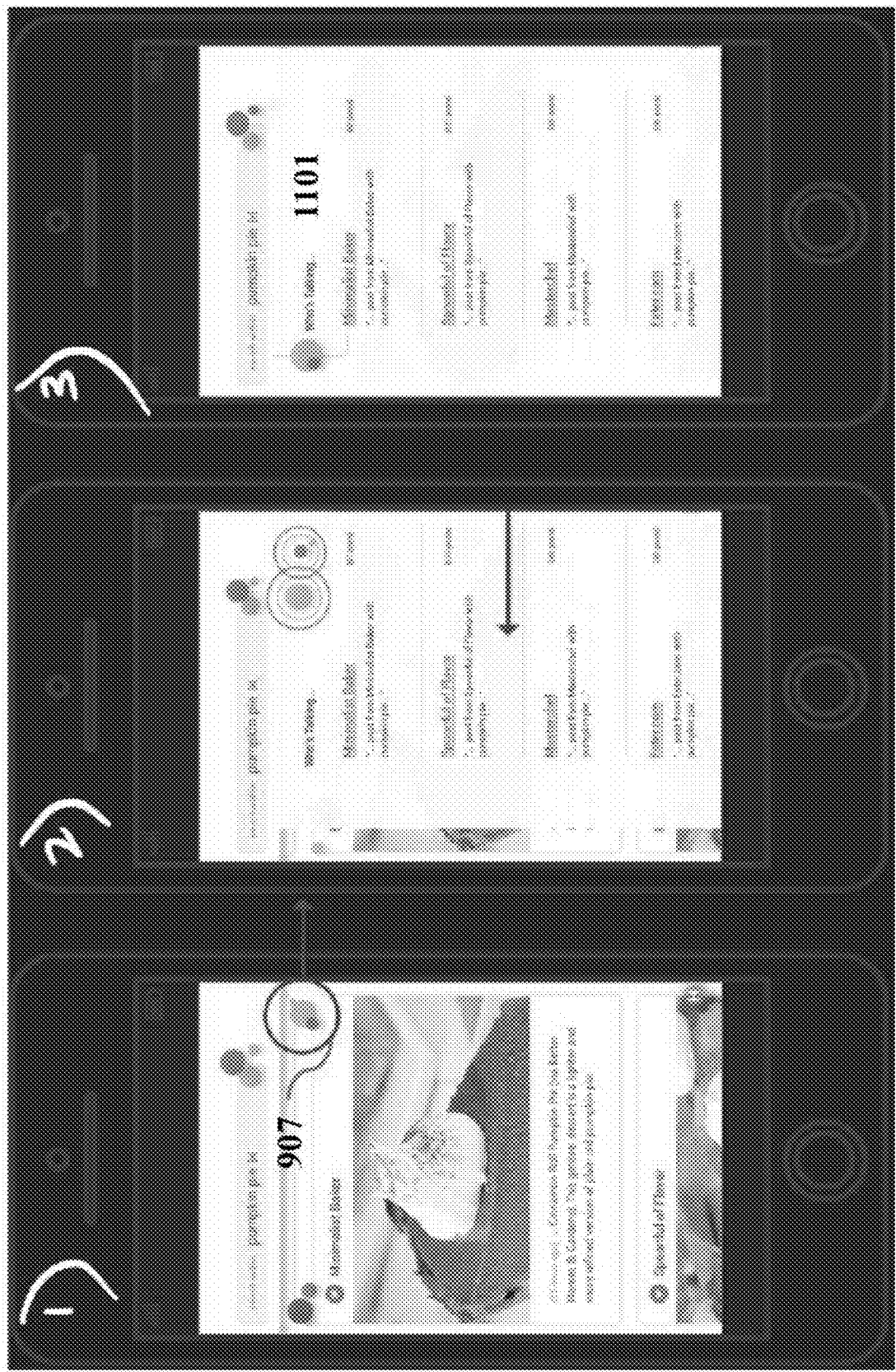
FIG. 11A-FIG. 11C show content filter panel for filtering search results by media sources with aid of animatable graphical elements.

FIGS. 11-11C show results in response to a navigational gesture (e.g., selecting animatable bubbles 907 on the page of FIG. 9A or FIG. 11A) indicating a request for filtering the media stream by media sources (i.e., social contributor). In response to receiving a user input at the animatable bubbles (e.g., tap or click on the purple bubbles 907 on the page of FIG. 9A or FIG. 11A) in the search-within mode indicating a request for filtering along the media source dimension, a content filter panel 1101 comprising one or more items such as media sources (e.g., Minimalist Baker, Spoonful of Flavor, Masterchef, Eater.com, etc) of the current search results may be presented to a user. FIG. 11B illustrates that the content filter panel 1101 may slide over the previous page along with animation of the bubbles 907. In some cases, the media sources may be sorted by the number of results provided by a media source. The user may also be permitted to perform a navigational gesture indicating a request for navigate back. For example, the user may swipe left on the page shown in FIG. 11C to navigate backward to the previous page or results.

In some cases, there can be overlap information along different dimensions. For example, the media sources displayed as a result of search along the media source dimension may also be presented as part of the result of a search along the industry dimension. For example, as shown in FIG. 10C, one or more media sources (e.g., Minimalist Baker, Spoonful of Flavor, Masterchef, Eater.com, etc) are grouped by industries (e.g., Food&drinks, New Orleans, Entertainment, etc) and presented to the user as a search result of filter along the industry dimension.

Figures 12A, 12B, 12C:
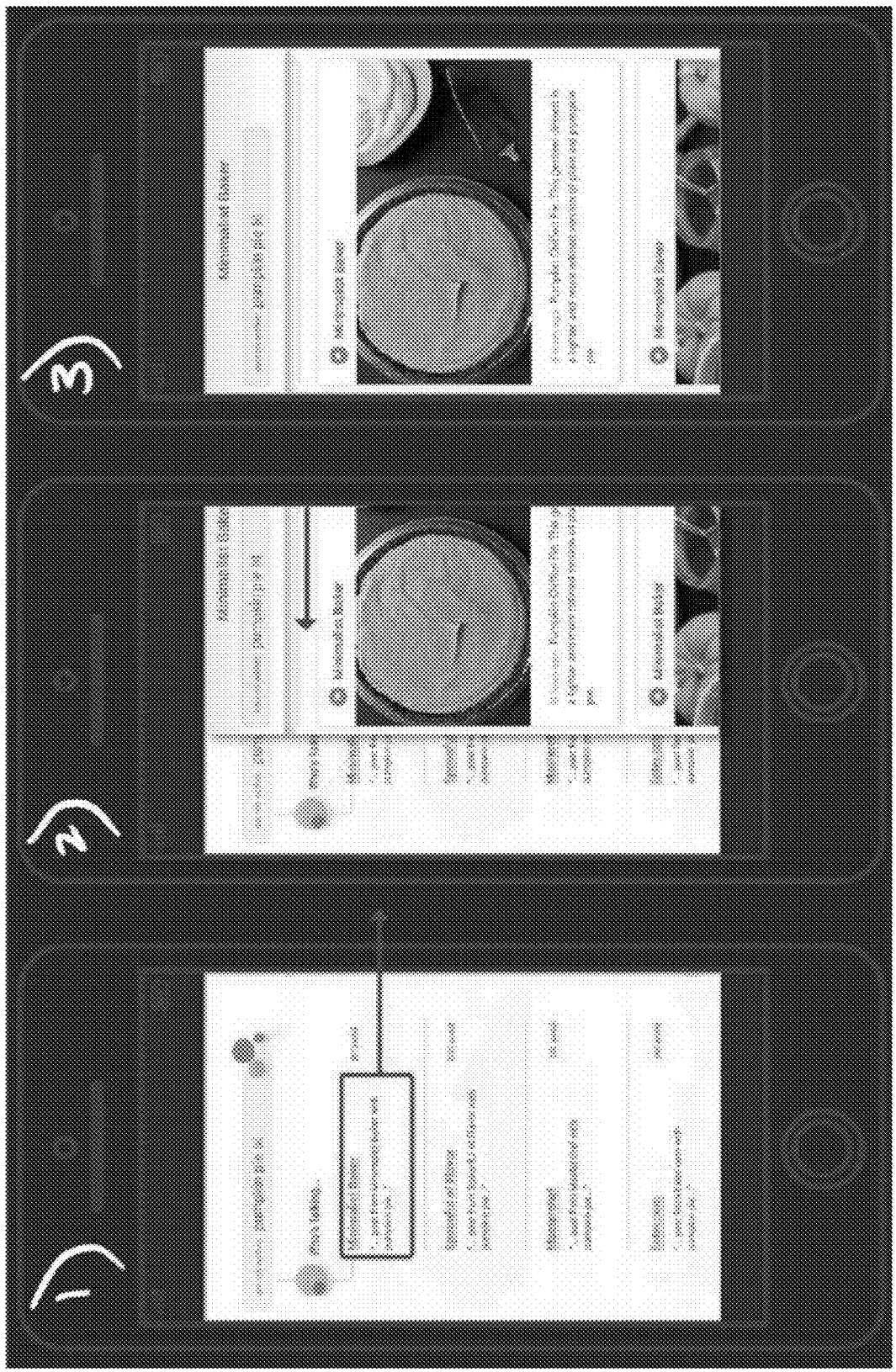

A user may select an item from the content filter panel (i.e., a media source) 1101. FIG. 12A illustrates that a user may click on "Minimalist Baker" to trigger a filter of current results and to view media stream provided by Minimalist Baker within current search results. FIG. 12B illustrates that the search result page may slide over the previous page and FIG. 12C shows the results of filter media stream by "Minimalist Baker".

In some embodiments, different search dimensions may be color coded. For example, a page of the search engine may comprise breadcrumbs serving as an effective visual aid, indicating the location of the user within the site's hierarchy. The breadcrumbs may be color coded to reflect different filter dimensions. For example, the breadcrumbs comprising filter by media source, industries and word may be presented in different colors. In the example illustrated in FIG. 12B, in the breadcrumbs, the search tool bar corresponding to filter by media source is in orange color which is different from the color (e.g., blue) of the search tool bar corresponding to the previous search.

Various other search actions or functions may be provided by the search engine. For example, the user can sort the search results by various fields, such as date posted. A user can utilize a content filter within the social stream to display posts in order from those with the most content to those with the least content. Such content can include text, uniform resource locators (URL's), images, video, and rich media While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A computer-implemented method for searching, filtering and presenting social media content, comprising:
   (a) receiving a search query on an electronic device of a user;
   (b) using at least said search query to (i) generate a first social media stream comprising a first set of content aggregated from a plurality of different sources and (ii) present said first social media stream on a user interface of said electronic device of said user, which social media stream is presented on said user interface with multiple animatable graphical elements, wherein said multiple animatable graphical elements are displayed with different visual features corresponding to a plurality of filtering operations along a plurality of filtering dimensions;
   (c) receiving input from said user on at least one of said multiple animatable graphical elements indicative of a request for performing a filtering operation on said first social media stream along a filtering dimension of said plurality of filtering dimensions; and
   (d) subsequent to receiving said input from said user in (c), (i) animating said multiple animatable graphical elements on said user interface and simultaneously (ii) presenting on said user interface a second social media stream comprising a second set of content, wherein said second set of content includes at least a subset of said first set of content displayed as a result of performing said filtering operation along said filtering dimension.

2. The computer-implemented method of claim 1, wherein (d) further comprises generating said second social media stream by automatically filtering said first social media stream along said filtering dimension in response to said request.

3. The computer-implemented method of claim 1, wherein said electronic device is a portable electronic device and said input from said user is received via a touch-screen of said portable electronic device.

4. The computer-implemented method of claim 1, further comprising receiving a touch-based gesture from said user to navigate said second social media stream, proceed to an additional social media stream, or proceed from said second social media stream to said first social media stream.

5. The computer-implemented method of claim 1, wherein said plurality of filtering dimensions include at least a filtering dimension along said plurality of different sources.

6. The computer-implemented method of claim 5, wherein said second set of content is ranked by the number of results provided by each source.

7. The computer-implemented method of claim 1, wherein said plurality of filtering dimensions include at least a filtering dimension along social tags and said second set of content comprises at least a portion of said first set of content grouped by said social tags.

8. The computer-implemented method of claim 7, wherein said second set of content is ranked based on relevancy of said social tags.

9. The computer-implemented method of claim 1, further comprising, prior to (c), animating said multiple animatable graphical elements on said user interface with a first animation, and subsequent to (c), animating said multiple animatable graphical elements with a second animation, wherein said second animation is different than said first animation in at least movement or trajectory indicative of a drill down filtering on said first social media stream.

10. A system for searching, filtering and presenting social media content, comprising:
   a communication interface in communication with a plurality of different sources of content; and
   one or more computer processors operatively coupled to said communication interface, wherein said one or more computer processors are individually or collectively programmed to:
   (a) receive a search query on an electronic device of a user;
   (b) use at least said search query to (i) generate a first social media stream comprising a first set of content aggregated from said plurality of different sources through said communication interface, and (ii) present said first social media stream on a user interface of said electronic device of said user, which social media stream is presented on said user interface with multiple animatable graphical elements, wherein said multiple animatable graphical elements are displayed with different visual features corresponding to a plurality of filtering operations along a plurality of filtering dimensions;
   (c) receive input from said user on at least one of said multiple animatable graphical elements indicative of a request for performing a filtering operation on said first social media stream along a filtering dimension selected from said plurality of filtering dimensions; and
   (d) subsequent to receiving said input from said user in (c), (i) animate said multiple animatable graphical elements on said user interface and simultaneously (ii) present on said user interface a second social media stream comprising a second set of content, wherein said second set of content includes at least a subset of said first set of content displayed as a result of performing said filtering operation along said filtering dimension.

11. The system of claim 10, wherein said one or more computer processors are programmed to further generate said second social media stream by automatically filtering said first social media stream along said filtering dimension in response to said request.

12. The system of claim 10, wherein said electronic device is a portable electronic device and said input from said user is received via a touch-screen of said portable electronic device.

13. The system of claim 10, wherein said one or more computer processors are programmed to further receive a touch-based gesture from said user to navigate said second social media stream, proceed to an additional social media stream, or proceed from said second social media stream to said first social media stream.

14. The system of claim 10, wherein said plurality of filtering dimensions include at least a filtering dimension along said plurality of different sources.

15. The system of claim 14, wherein said second set of content is ranked by the number of results provided by each source.

16. The system of claim 10, wherein said plurality of filtering dimensions include at least a filtering dimension along social tags and said second set of content comprises at least a portion of said first set of content grouped by said social tags.

17. The system of claim 16, wherein said second set of content is ranked based on relevancy of said social tags.

18. The system of claim 10, wherein said one or more computer processors are programmed to further, prior to (c), animate said multiple animatable graphical elements on said user interface with a first animation, and subsequent to (c), animate said multiple animatable graphical elements with a second animation, wherein said second animation is different than said first animation in at least movement or trajectory indicative of a drill down filtering on said first social media stream.

19. The computer-implemented method of claim 1, wherein said different visual features of said multiple animatable graphical elements comprise different colors or different locations for displaying said multiple animatable graphical elements on said user interface.

* * * * *